United States Patent [19]
Bargauan

[11] Patent Number: 5,822,020
[45] Date of Patent: Oct. 13, 1998

[54] METHOD AND DEVICE FOR GENERATING A MODULATED TELEVISION SIGNAL

[75] Inventor: Michele Bargauan, Milan, Italy

[73] Assignee: M.B. International S.r.l., Livigno, Italy

[21] Appl. No.: 620,861

[22] Filed: Mar. 6, 1996

[30] Foreign Application Priority Data

Mar. 10, 1995 [IT] Italy ................................. MI95A0476

[51] Int. Cl.[6] .................................................. H04N 5/40
[52] U.S. Cl. ............................................. 348/724; 455/47
[58] Field of Search .................................. 348/724, 469, 348/384; 332/170; 455/47, 109

[56] References Cited

U.S. PATENT DOCUMENTS

| | | | |
|---|---|---|---|
| 3,955,155 | 5/1976 | Behrend | 348/724 |
| 4,533,960 | 8/1985 | Tiemann | 348/724 |
| 4,622,694 | 11/1986 | Weber | 455/47 |

FOREIGN PATENT DOCUMENTS 000508741 10/1992 European Pat. Off. ......... H04N 5/40

*Primary Examiner*—Victor R. Kostak
*Attorney, Agent, or Firm*—Guido Modiano; Albert Josif

[57] ABSTRACT

The method envisages performing a first filtering and a second filtering of a video signal to obtain two signals, one signal having a passband that is equal to the complete band and a bandwidth that is a function of the frequency, and another signal whose passband is equal to the side band to be suppressed, and amplitude-modulating the signal having a complete passband with a video carrier, obtaining a first signal. The signal whose sideband is equal to the band to be suppressed is phase-shifted by 90° and modulated with the video carrier phase-shifted by 90°, obtaining a second signal. The algebraic sum of the first signal and of the second signal obtains a third signal that represents the television signal having the desired side band.

18 Claims, 1 Drawing Sheet

METHOD AND DEVICE FOR GENERATING A MODULATED TELEVISION SIGNAL

BACKGROUND OF THE INVENTION

The present invention relates to a method for generating a modulated television signal with improved characteristics and to a device for performing said method.

The television transmission mode that uses two carriers, one for audio and one for video, is known in the art.

As regards the video part, the video signal modulates a video carrier with positive or negative modulation and is then shaped with a partially suppressed sideband. This type of modulation is termed vestigial modulation (VSB—Vestigial Sideband), and with respect to conventional amplitude modulation it has the advantages of reducing the occupied band without appreciably degrading picture quality, requiring less power to transmit the information, in addition to a good response to low frequencies.

For the audio part, the audio signal frequency modulates the carrier.

In old transmitters, modulation was performed by amplifying the carrier to the maximum power level and then modulating it. Filtering was performed at high power with the use of very expensive and bulky power filters that were highly unstable. The power filters therefore required periodic adjustments and were highly temperature-sensitive, requiring special conditioning systems.

Currently, the video part of the signal is generated with analog methods. The video carrier is modulated, at an intermediate frequency (IF), by the video signal, generating a signal with two sidebands, and is then filtered in order to obtain the desired shaping of the sidebands. Filtering is achieved with analog filters of the SAW (Surface Acoustic Wave) type, which must be produced differently according to the television standard that is used. A drawback of this solution is the fact that the generated television signal has limited characteristics in terms of quality, linearity, flexibility, and stability, which are a consequence of the analog-type processing to which it has been subjected. Another drawback of this solution is the fact that it requires many level adjustments for white, black, sync signals, and other parameters that are necessary for linear power amplification. Furthermore, analog generation of the video signal has the drawback that if one wishes to transmit a digital signal, which is the future of television development, it requires a subsequent conversion from analog to digital, with further adjustments. Finally, the generated television signal does not have particularly good characteristics in terms of quality, linearity, and stability.

SUMMARY OF THE INVENTION

The aim of the present invention is therefore to provide a method and a device for generating a modulated television signal with improved characteristics in terms of quality, linearity, flexibility, and stability.

Within the scope of this aim, an object of the present invention is to provide a method and a device for generating a television signal that uses fully-digital processing to generate the final video signal.

Another object of the present invention is to provide a method for generating a television signal that can be adapted with simple modifications to all television standards.

Another object of the invention is to provide a method and a device for generating a television signal that has characteristics of absolute linearity and mathematical precision.

Another object of the present invention is to provide a method for generating a television signal that uses processing that is mixed, i.e., partially digital and partially analog.

Another object of the present invention is to provide a method for generating a television signal that is highly reliable and relatively easy to provide at competitive costs.

With this aim, these objects, and others, which will become apparent hereinafter, in view, there is provided a method for generating a television signal, characterized in that it comprises the steps that consist in:

performing a first filtering and a second filtering of a video signal to obtain two signals, one having a passband that is equal to the complete band and a bandwidth that is a function of the frequency, and another one whose passband is equal to the side band to be suppressed;

amplitude-modulating said signal whose passband is equal to the complete band with a video carrier, obtaining a first signal;

phase-shifting by 90° said signal whose passband is equal to the side band to be suppressed and modulating it with the video carrier, phase-shifted by 90°, obtaining a second signal;

performing the algebraic sum of said first signal and of said second signal to obtain a third signal that represents the television signal having the desired side band.

BRIEF DESCRIPTION OF THE DRAWINGS

Further characteristics and advantages of the invention will become apparent from the description of a preferred but not exclusive embodiment of a method and a device according to the invention, illustrated only by way of non-limitative example in the accompanying drawings, wherein.

DESCRIPTION OF THE PREFERRED EMBODIMENTS

Figure 1:
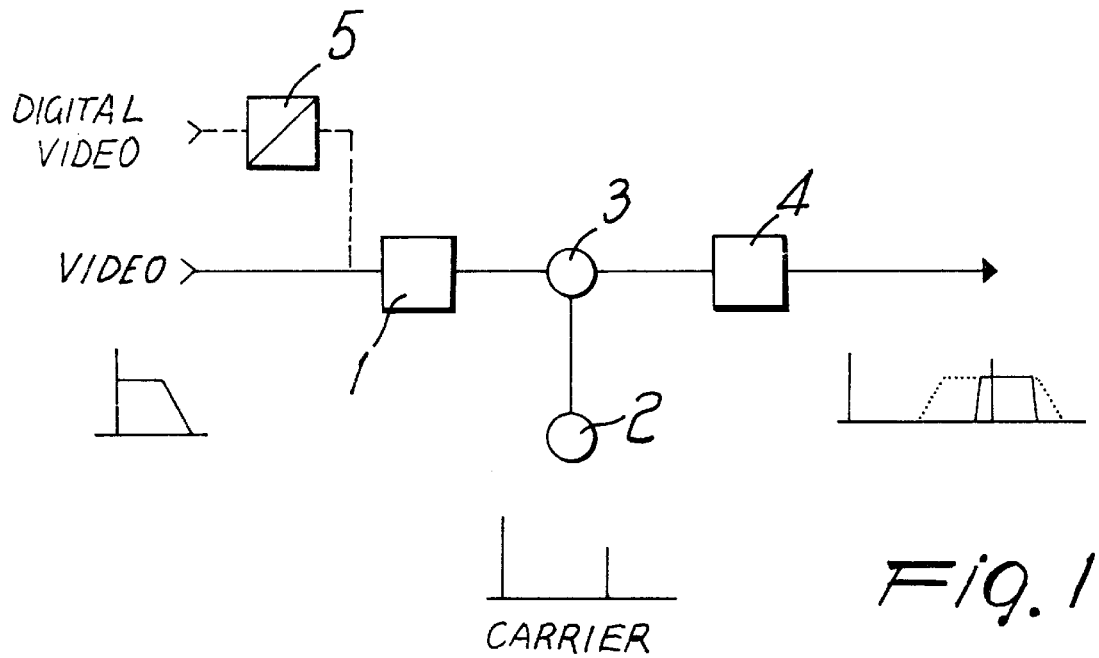
FIG. 1 is a block diagram of the steps of the method for generating a television signal according to the prior art.

FIG. 1 shows, in the form of a block diagram, the method for generating a television signal according to the prior art, which comprises the steps that consist in modulating (step 3) with a modulator 3 the video carrier 2 with an analog signal, which is filtered (step 1) in a filter. The modulated carrier 2 is then filtered (step 4) in a VSB (Vestigial Sideband) filter to obtain in output the adequate shaping of the sidebands. If one uses a digital video signal, it is necessary to convert it (step 5) into an analog signal by means of a D/A converter before filtering it (step 1) in the filter.

Figure 2:
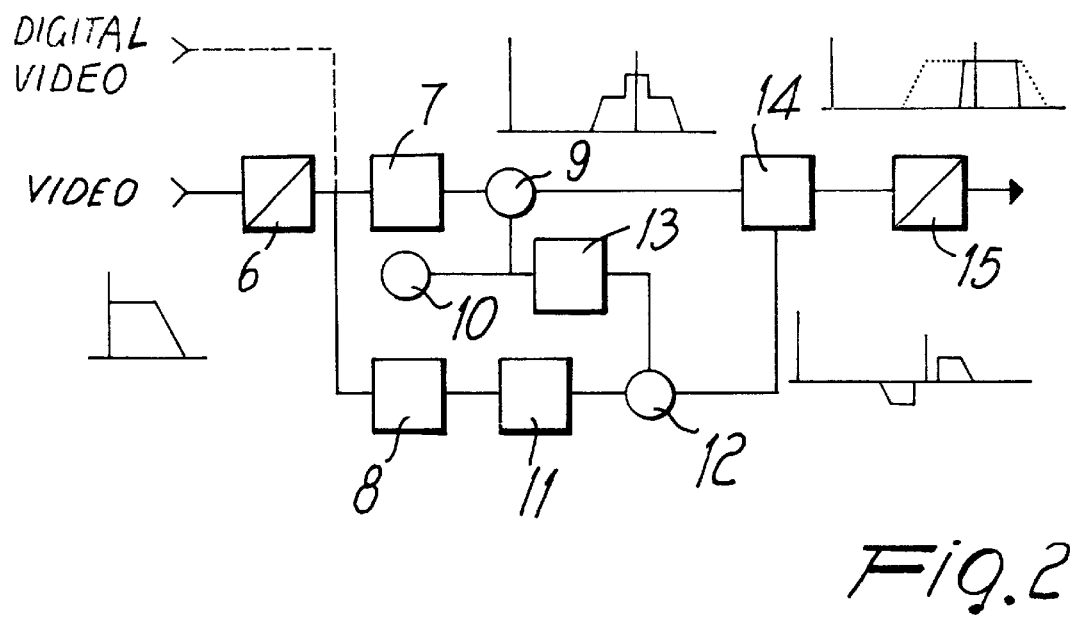
FIG. 2 is a block diagram of the steps of the method for generating a television signal according to the present invention; said block diagram is also a diagram of the device according to the invention.

FIG. 2 is a block diagram of the steps of the method according to the invention.

The method starts with the conversion into digital form (step 6) of the analog video signal in an A/D converter. Of course, if a digital video signal is used directly, this conversion step is not performed. Then there are a first filtering step and a second filtering step (steps 7 and 8) of the video signal to obtain two signals, a first signal whose passband is equal to the complete sideband (step 7) and a second signal whose passband is equal to the sideband to be suppressed (step 8).

The first signal that is obtained has an amplitude of between 1 and 0 and the maximum frequency of the suppressed sideband is 0.5 between the suppressed sideband and the maximum frequency of the signal. The first signal furthermore modulates (step 9) a video carrier 10 whose phase is 0.

The second signal instead has an amplitude of 0.5 and a passband that is equal to the sideband to be suppressed. This second signal is phase-shifted by 90° (step 11) and numerically modulates (step 12) a video carrier 10 that is also phase-shifted by 90°. The phase-shifting of the video carrier 10 occurs in step 13.

By performing an algebraic sum (step 14) of the second signal and the first signal, a third signal is generated which represents the television signal having the desired sideband. In particular, by performing an addition one obtains the television signal with the upper sideband, whereas by performing a subtraction one obtains the television signal with the lower sideband.

The third signal thus obtained is then added to the audio carrier to obtain the complete television signal and is converted from digital to analog (step 15). Of course, in the case of a transmission of a digital signal, the digital-to-analog conversion step is not performed.

In mathematical terms, given:

$f_{max}$: maximum frequency of the complete sideband
$f_{sb}$: maximum frequency of the suppressed sideband $$c(t) = \cos(\omega t) \qquad = \text{video carrier}$$

$$s(t) = \sum_{k=0}^{f_{MAX}} s_k \cos(\omega_k t + \phi_k) \qquad = \text{video signal}$$

Filtering the video signal, obtains:

$$s_{filtered}(t) = \sum_{k=0}^{f_{SB}} s_k \cos(\omega_k t - \phi_k) + \sum_{k=f_{SB}}^{f_{MAX}} \frac{1}{2} s_k \cos(\omega_k t - \phi_k) \quad \text{(step 7)}$$

Filtering the video signal and adding a 90° phase shift, obtains:

$$s_{filtered}^{90}(t) = \sum_{k=f_{SB}}^{f_{MAX}} \frac{1}{2} s_k \sin(\omega_k t - \phi_k) \quad \text{(step 8)}$$

Phase-shifting the video carrier 10, obtains:

$$c^{90}(t) = \sin(\omega t) \quad \text{(step 13)}$$

Modulating the filtered video signal with the video carrier obtains:

$$m_1(t) = c(t) * s_{filtered}(t) = \quad \text{(step 9)}$$

$$\cos(\omega_p t) * \left( \sum_{k=0}^{f_{SB}} s_k \cos(\omega_k t - \phi_k) + \sum_{k=f_{SB}}^{f_{MAX}} \frac{1}{2} s_k \cos(\omega_k t - \phi_k) \right)$$

Modulating the filtered and phase-shifted signal with the phase-shifted video carrier, obtains:

$$m_2(t) = c^{90}(t) * s_{filtered}^{90}(t) = \sin(\omega_p t) * \sum_{k=f_{SB}}^{f_{MAX}} \frac{1}{2} s_k \sin(\omega_k t - \phi_k) \quad \text{(step 12)}$$

By performing the algebraic sum of the first signal and the second signal, the television signal having the desired sideband is obtained:

$$tv_{OUT} = m_1 + m_2 = \sum_{k=0}^{f_{SB}} s_k (\cos((\omega_p + \omega_k)t - \phi_k) + \quad \text{(step 14)}$$

$$\cos((\omega_p - \omega_k)t - \phi_k)) + \sum_{k=f_{SB}}^{f_{MAX}} \frac{1}{2} s_k \cos((\omega_p + \omega_k)t - \phi_k)$$

Of course, one can choose the upper or lower sideband by appropriately changing the phase between the main component and the phase-shifted one.

The device for generating a modulated television signal according to the present invention is also shown in the block diagram of FIG. 2.

The device comprises analog-to-digital conversion means 6, appropriately constituted by an analog-to-digital converter, which are adapted to convert the input video signal into digital form. First and second filtering means 7 and 8 are connected to the means 6. The first filtering means 7 are advantageously constituted by a low-pass filter, whereas the second filtering means 8 are conveniently constituted by a band-pass filter. First phase-shifting means 11 are connected to the band-pass filter 8 and are adapted to phase-shift the signal through 90° after filtering in the filtering means 8.

First modulation means 12, advantageously constituted by a modulator, are cascade-connected to the phase-shifting means 11 and are adapted to modulate the filtered and phase-shifted video signal in output from the phase-shifting means 11, together with a video carrier 10, which is also phase-shifted by 90° in second phase-shifting means 13.

Second modulating means 9, advantageously constituted by a modulator, are cascade-connected to the filtering means 7 and are adapted to modulate the video signal filtered by the filtering means 7, together with the video carrier 10.

Adder means, which receive in input the signal in output from the first and second modulating means 12 and 9, are adapted to add the two signals thus obtained. Additional digital-to-analog conversion means 15, conveniently constituted by a D/A converter, are cascade-connected to the adder means 14 and are adapted to convert into digital form the complete video signal obtained in output from the adder means 14.

In practice it has been observed that the method and the device according to the invention fully achieve the intended aim, since they allows to obtain, by virtue of a fully digital processing of the video signal, a television signal that has improved characteristics. In particular, the fully digital processing of the video signal allows to achieve absolute linearity and mathematical precision of the signal, as well as the possibility of complying with any television standard by virtue of simple software modifications. The signal/noise ratio is considerably better than the one obtained with analog processing methods. Furthermore, the use of digital filtering allows to filter the signal band exactly at the desired point with mathematical precision. The reconstruction of the signal is also performed with mathematical precision without band overlap or loss errors.

The method and the device thus conceived are susceptible of numerous modifications and variations, all of which are within the scope of the inventive concept; all the details may furthermore be replaced with other technically equivalent elements.

A variation of the method for generating a television signal is represented by a hybrid solution that is partially digital and partially analog. This variation has been studied to improve existing transmitters that use direct modulation. In this variation, the first signal and the second signal ($m_1(t)$ and $m_2(t)$) are converted from analog to digital and modulate two carriers that are phase-shifted by 90°.

Then the resulting signals are added with a directional coupler; the value of this coupler can vary according to the available power levels; advantageously, the most appropriate according to tests seems to be −10 dB.

The power of the signal decreases by a small amount, whereas the power of the sidebands is higher than the nominal value to compensate for the losses of the directional coupler. The efficiency of the adder circuit is 90% (for a coupler at −10 dB) for the main signal: this value is very close to that of conventional filters but does not entail the same drawbacks.

The power required by the signal having sidebands is −9 dB relative to the nominal output power level, and this leads to much lower costs for additional circuits than those of conventional filters.

In practice, the materials employed, so long as they are compatible with the specific use, as well as the dimensions, may be any according to the requirements and the state of the art.

What is claimed is:

1. Method for generating a modulated television signal, comprising the steps that consist in:

performing a first filtering and a second filtering of a video signal to obtain two signals, one having a passband that is equal to the complete band and a bandwidth that is a function of the frequency, and another one whose passband is equal to the side band to be suppressed;

amplitude-modulating said signal whose passband is equal to the complete band with a video carrier, obtaining a first signal;

phase-shifting by 90° said signal whose passband is equal to the side band to be suppressed and modulating it with a video carrier that is phase-shifted by 90°, obtaining a second signal;

performing the algebraic sum of said first signal and of said second signal to obtain a third signal that represents the television signal having the desired side band.

2. Method according to claim 1, comprising the step that consists in adding said third signal to the audio carrier, obtaining in output the complete television signal.

3. Method according to claim 1, comprising the step that consists in converting from analog to digital said third signal added to the audio carrier.

4. Method according to claim 1, wherein said algebraic sum performed with said first and second signals is an addition to obtain the upper sideband.

5. Method according to claim 1, wherein said algebraic sum of said first and second signals is a subtraction to obtain the lower sideband.

6. Method according to claim 1, comprising analog-to-digital conversion, said analog-to-digital conversion being performed before said first filtering and said second filtering.

7. Method according to claim 1, wherein said first signal obtained from said first filtering is a signal with two sidebands.

8. Method according to claim 1, wherein said first signal has an amplitude of 1 between the zero frequency and the frequency that is equal to the maximum frequency of the suppressed sideband, and an amplitude of 0.5 between said maximum frequency of the suppressed sideband and the maximum frequency of the video signal.

9. Method according to claim 1, wherein said second signal has an amplitude of 0.5 and a band that lies between said maximum frequency of the suppressed sideband and said maximum frequency of the video signal.

10. Method according to claim 1, wherein it comprises the following steps:

converting said first signal and said second signal from analog to digital;

modulating, with said first signal and said second signal, two carriers that are mutually phase-shifted by 90°;

adding the signals that are the result of said modulation with a directional coupler, so as to obtain in output said television signal having the desired sideband.

11. Device for generating a modulated television signal, comprising: first and second filtering means that are adapted to filter the video signal in input; first phase-shifting means that are adapted to phase-shift by 90° the signal in output from said second filtering means; first modulating means that are adapted to modulate the signal in output from said first phase-shifting means together with a video carrier that is phase-shifted by 90° by virtue of second phase-shifting means; second modulating means that are adapted to modulate the signal in output from said first filtering means together with the carrier; adder means, which are adapted to add said signals in output from said first and second modulating means respectively and to produce in output the desired modulated television signal.

12. Device according to claim 11, wherein said first filtering means comprise a low-pass filter and are adapted to generate a signal whose passband is equal to the complete band.

13. Device according to claim 11, wherein said second filtering means comprise a band-pass filter and are adapted to generate a signal with a passband that is equal to the sideband to be suppressed.

14. Device according to claim 11, wherein said first and second modulation means comprise a first modulator and a second modulator respectively.

15. Device according to claim 11, comprising analog-to-digital conversion means adapted to convert into digital form said video signal in input to said first and second filtering means.

16. Device according to claim 15, wherein said analog-to-digital conversion means comprise an A/D converter.

17. Device according to claim 11, comprising digital-to-analog conversion means that are adapted to convert into analog form said signal in output from said adder means.

18. Device according to claim 17, wherein said digital-to-analog conversion means comprise a D/A converter.

* * * * *